July 31, 1956  U. NISTRI  2,756,653
NADIR POINT METHODS FOR PLANIMETRIC AIR PHOTOGRAPHS
Filed June 1, 1953  2 Sheets-Sheet 1
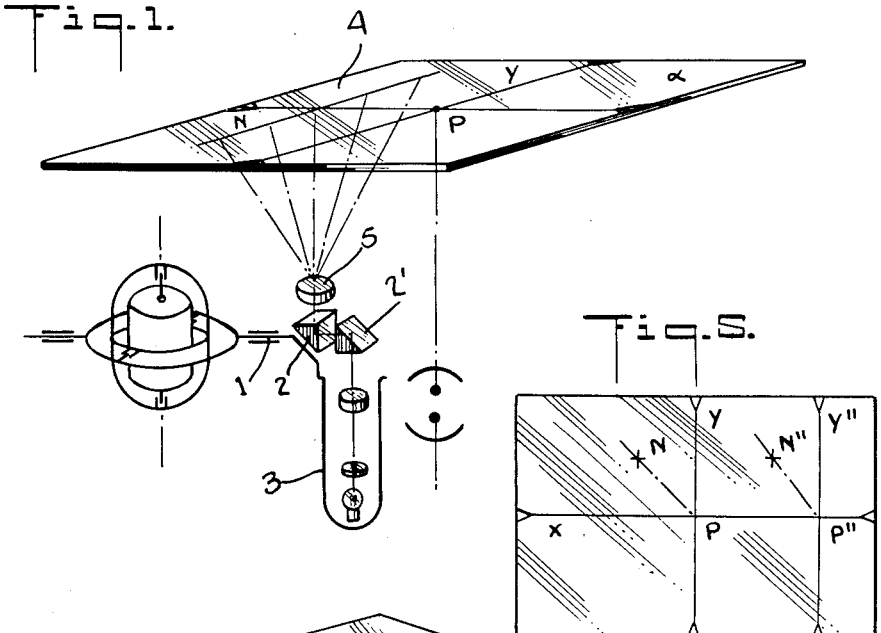
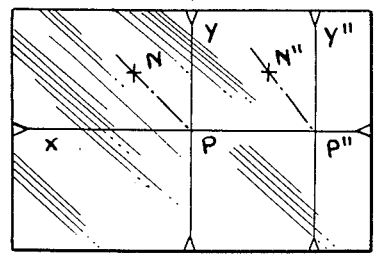
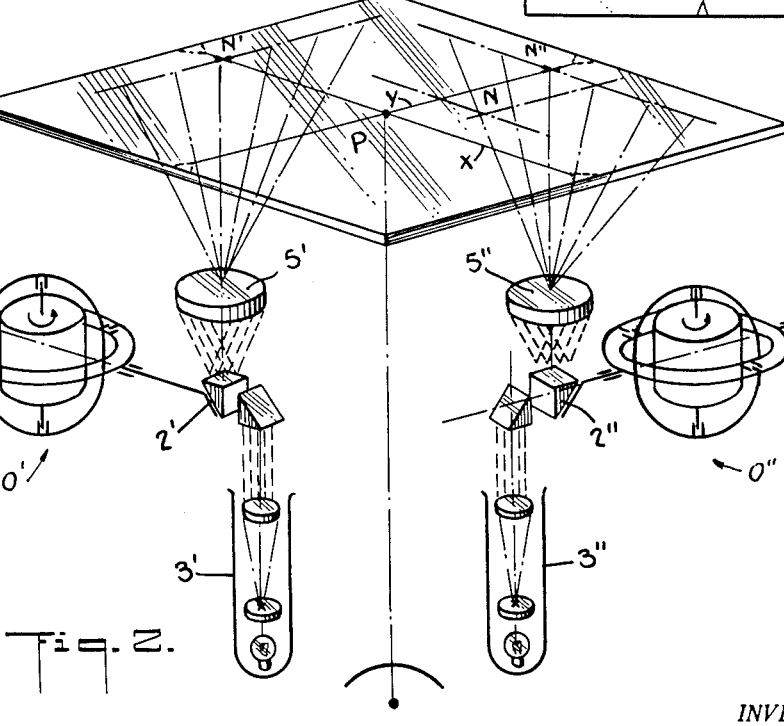
INVENTOR.
UMBERTO NISTRI
BY
ATTORNEY

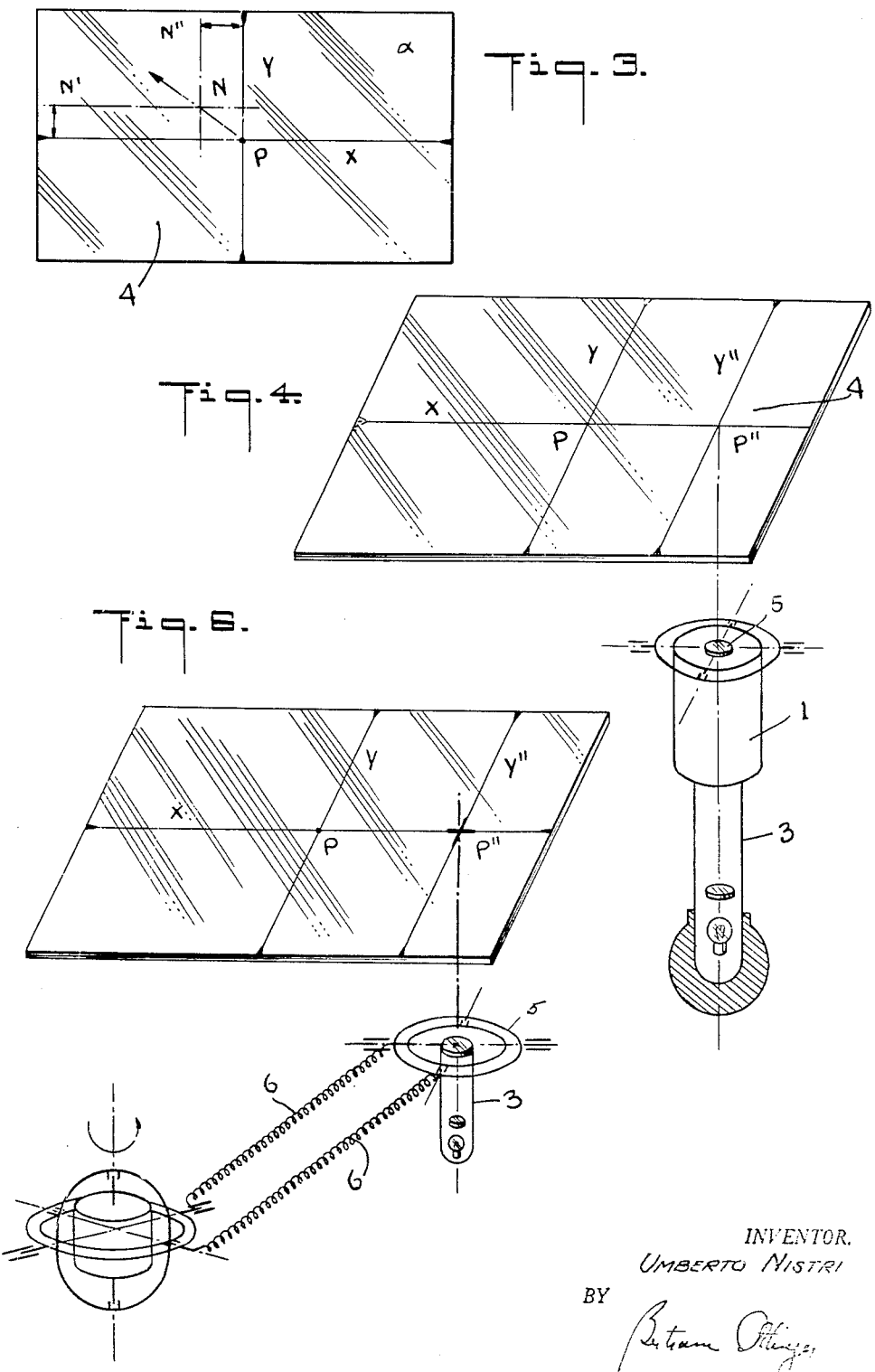

United States Patent Office 2,756,653
Patented July 31, 1956

2,756,653

NADIR POINT METHODS FOR PLANIMETRIC AIR PHOTOGRAPHS

Umberto Nistri, Rome, Italy

Application June 1, 1953, Serial No. 358,898

Claims priority, application Italy June 20, 1952

7 Claims. (Cl. 95—1.1)

The various systems to record the nadir point on planimetric air photographs are known.

A device is described in Patent No. 449,440 by which the recording of the nadir point, or the intersection of the vertical line passing through the photograph taking point with the plane of the photograph, takes place through the camera lens itself at the moment the photograph is taken, so that it is marked on the photogram of the terrain in its true position.

This device, although having notable advantages, still presents, in practical actuation, some disadvantages which are particularly felt in wide-angle taking cameras because of the mirror and prism arranged outside the camera on the beam of the images which enters the camera lens to take the photogram.

In addition, the system of levers used to connect the axes of the gyroscope with the mirror, can cause resistances which hinder the free operation of these, affecting the precision of the indication.

The object of the present invention is to avoid said disadvantages while conserving the possibility of determining the nadir point on the photograph itself with equal ease, exactitude, and without hindering the free operation of the gyroscope or other suitable instrument.

In the accompanying drawings in which are shown various possible embodiments of my invention:

Fig. 1 is a perspective schematic view of a planimetric projection system embodying my invention and employing a gyroscopic erecting means;

Fig. 2 is a view similar to Fig. 1 but illustrating a modified form of my invention and employing a pair of gyroscopic erecting means;

Fig. 3 is a plan view of the photogram shown in Fig. 2;

Fig. 4 is another view similar to Fig. 1, but showing still a different form of my invention in which a pendulum is employed as the erecting means;

Fig. 5 is a plan view of the photogram showing a different set of conditions; and Fig. 6 is another view similar to Fig. 1, but showing yet another form of my invention in which a remote gyroscopic erecting means is employed.

In Fig. 1, a gyroscope with three degrees of freedom, similar to those used in air navigation to indicate the position of the horizon, supports, at one extremity of its primary axis 1, a mirror or prism 2 arranged at 45°, which is thus forced to rotate solidly to said axis. The primary axis of the gyroscope is arranged parallel with the plane of the photogram. In front of mirror 2, suitably arranged with its axis parallel to the primary axis of the gyroscope, is arranged a collimator 3 whose emerging rays are reflected by mirror 2 onto the plane of the photogram 4. A lens 5 is interposed between mirror 2 and the plane of the photogram 4 in order to provide said plane with the image of the grid N emerging in parallel rays from the collimator 3.

In Fig. 2 is represented, in schematic form, the camera with two such devices O' and O", arranged with their primary axes at 90° to each other. They are parallel to the plane of the photogram and therefore at right angles to the principal axis of the camera.

Under conditions of rectification, when the camera axis is vertical, the center of the grid of each, N' and N", coincides with the corresponding axis, X or Y, which pass through the principal point of the camera and which serve to renew, in known ways, the internal orientation of the photogram.

When the camera is inclined in any direction, the centers of these grids, which represent the points of intersection between the plane of the photogram and a vertical line passing through the principal axis of the gyroscope, move on the plane of the photogram in relation to its respective axes X or Y by an amount which is a function of the angle of inclination of the principal axis of the camera in respect to the vertical plane which contains the primary axis of the gyroscope.

In Fig. 3 is shown the position of the centers of the grids N' and N" for a determined inclination of the principal axis of the camera. Tracing two parallels to the axes X and Y, their point of intersection N on the plane of the photogram 4 (Fig. 3) indicates the position of the nadir point on the photogram. The segment PN represents the nadir distance and forms part of the line of intersection, with the plane of the photograph, of the vertical plane passing through the taking point and containing the principal axis of the camera.

When the distance between the center of the secondary lens 5 from the plane of the photogram is equal to the principal distance of the camera, the position of point N is in reality that of the nadir point of the photogram, whereas if the distance of the centers of the secondary lenses 5' and 5" is different from the principal distance of the camera, it will find itself, starting from point P along the line PN, in the relation existing between the distance of the centers of these secondary lenses from the plane of the photogram, to the principal distance of the camera.

In Fig. 4 is indicated a variation for recording directly the direction PN. It is indicated for the use of pendulums of other means, such as, for example, the remote transmission of the indications furnished by a gyroscope arranged in a suitable position.

Pendulum 1 is mounted on gimbals around the secondary lens 5 and relayed to the plane of the photograph 4.

Under rectification conditions, when the plane of the photogram 4 is horizontal, the center of the grid projected by the collimator coincides with the intersection P" of axis X and a second axis Y indicated, in known ways, on the photogram, an intersection which represents the foot of the line drawn from the center of secondary lens 5 at right angles to the plane of the photogram.

When the axis of the camera is inclined, the segment P"N" (Fig. 5) represents the nadir distance and the position on the plane of the photogram, of the vertical plane containing the principal axis of secondary lens 5.

In order to obtain the exact indication, on the plane of the photogram, of the nadir point as referred to the internal orientation of the take, it will be sufficient to trace a line starting from P, parallel to P"N" and mark a segment PN on it in the same relation with P"N" as the principal distances of the taking lens and the secondary lens 5 are between themselves.

In Fig. 6 is indicated a variation to the preceding case. A collimator 3 is mounted on gimbals and the axes of the cardan which support it are parallel and connected by means of levers 6 or remote transmissions in known ways, to the corresponding axes of a gyroscope or other instrument capable of furnishing the indication of the vertical.

What I claim is:

1. A device for recording the inclination of an aerial camera on a film in said camera, said device comprising a first means maintaining a vertical position, said means having a primary axis of revolution and a secondary axis of revolution, a second means maintaining a vertical position, said second means having a primary axis of revolution and a secondary axis of revolution, said two primary axes of revolution intersecting and conjointly defining a plane parallel to the film, a first optical system linked to the primary axis only of the first means and arranged to project a first image on the film which shifts with movement of the camera in a plane perpendicular to said first primary axis, and a second optical system linked to the primary axis only of the second means and arranged to project a second image on the film which shifts with movement of the camera in a plane perpendicular to said second primary axis.

2. A device as set forth in claim 1 wherein the first and second means are gyroscopes.

3. A device as set forth in claim 1 wherein the first and second means are pendulums.

4. A device as set forth in claim 1 wherein the two primary axes are at right angles to one another.

5. A device as set forth in claim 1 wherein both images are images of reticles.

6. A device as set forth in claim 1 wherein each optical system includes a lens independent of the camera lens.

7. A device as set forth in claim 1 wherein the optical systems are remote from the first and second means, and wherein the optical systems are supported by gimbals.

References Cited in the file of this patent

UNITED STATES PATENTS

| | | |
|---|---|---|
| 1,880,960 | Keale | Oct. 4, 1932 |
| 2,047,070 | Horner | July 7, 1936 |
| 2,210,090 | Lutz | Aug. 6, 1940 |
| 2,273,876 | Lutz | Feb. 24, 1942 |